US012565926B2

(12) United States Patent
Yamashita et al.

(10) Patent No.: US 12,565,926 B2
(45) Date of Patent: Mar. 3, 2026

(54) POWER TRANSMISSION DEVICE

(71) Applicants: JATCO LTD, Fuij (JP); Nissan Motor Co., Ltd., Yokohama (JP)

(72) Inventors: Katsunori Yamashita, Chigasaki (JP); Masayasu Kinoshita, Hadano (JP); Masahiro Kouya, Hiratsuka (JP); Tomoo Ikeda, Isesaki (JP)

(73) Assignees: JATCO LTD, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/846,971

(22) PCT Filed: Mar. 23, 2023

(86) PCT No.: PCT/JP2023/011617
§ 371 (c)(1),
(2) Date: Sep. 13, 2024

(87) PCT Pub. No.: WO2023/182454
PCT Pub. Date: Sep. 28, 2023

(65) Prior Publication Data
US 2025/0198499 A1 Jun. 19, 2025

(30) Foreign Application Priority Data
Mar. 23, 2022 (JP) ................................ 2022-047614

(51) Int. Cl.
*F16H 57/04* (2010.01)
*F16H 57/02* (2012.01)
*F16H 57/031* (2012.01)

(52) U.S. Cl.
CPC ..... *F16H 57/0441* (2013.01); *F16H 57/0436* (2013.01); *F16H 2057/02043* (2013.01); *F16H 57/031* (2013.01)

(58) Field of Classification Search
CPC . F16H 57/031; F16H 57/0436; F16H 57/0441
See application file for complete search history.

(56) References Cited

U.S. PATENT DOCUMENTS 9,108,499 B2 * 8/2015 Long ................... F16H 61/0031
9,845,869 B2 * 12/2017 Shirasaka ........... F16H 61/0031
(Continued)

FOREIGN PATENT DOCUMENTS

JP 2015-045401 A 3/2015
JP 2019-173943 A 10/2019

*Primary Examiner* — Minh Truong
(74) *Attorney, Agent, or Firm* — Spencer Fane LLP

(57) ABSTRACT

A power transmission device includes a case, a control valve, and an electric pump. The case has a first chamber that accommodates a power transmission mechanism, and a second chamber in which the control valve is arranged upright, with pressure regulating valves being aligned in a vertical direction. An axis of rotation of a motor of the electric pump is aligned in the vertical direction. The control valve and the electric pump are arranged in a direction of an axis of rotation of the power transmission mechanism. The electric pump has a first flange section where a first arm of a jig engages, and a supported section supported by a second arm of the jig. The supported section forms a circular basic cross-sectional shape in a plane orthogonal to the axis of rotation of the motor. The first flange section extends from an outer circumference of the supported section.

8 Claims, 8 Drawing Sheets

(56) References Cited

U.S. PATENT DOCUMENTS

| | | | |
|---|---|---|---|
| 11,679,657 B1 * | 6/2023 | Atqiaee | B60K 17/165 |
| | | | 475/150 |
| 2012/0020781 A1 * | 1/2012 | Bell | F01C 21/007 |
| | | | 74/606 R |
| 2014/0091023 A1 * | 4/2014 | Long | F16N 9/00 |
| | | | 184/7.4 |
| 2016/0223070 A1 * | 8/2016 | Kito | F16H 57/0441 |
| 2016/0281842 A1 | 9/2016 | Fukui et al. | |

* cited by examiner

VEHICLE WIDTH DIRECTION

VEHICLE FRONT-REAR DIRECTION

FRONT

REAR

POWER TRANSMISSION DEVICE

CROSS-REFERENCE TO RELATED APPLICATIONS

This application is a U.S. national stage application of International Application No. PCT/JP2023/011617, filed on Mar. 23, 2023. This application also claims priority to Japanese Patent Application No 2022-047614, filed on Mar. 23, 2022.

BACKGROUND

Technical Field

The present invention relates to a power transmission device.

Background Information

Japanese Patent Laid-Open Publication No. 2019-173943 discloses a drive device for a vehicle in which an oil pressure control device is arranged in an upright posture along the vertical direction.

SUMMARY

In this vehicle drive device, an oil pressure control device is arranged upright (in an upright posture) on the side of a case that houses a drive transmission mechanism. An electric pump for supplying oil to the oil control device is provided at the bottom of the case, oriented along the horizontal line direction.

When viewed from the horizontal line direction, the oil pressure control device is provided in a positional relationship overlapping with the drive transmission mechanism and the electric pump.

When viewed from the horizontal line direction, the case has an opening provided on one side of the case. During assembly of the vehicle drive device, the case is positioned with the opening facing upwards, after which the oil pressure control device is installed from above into the opening. The electric pump is inserted into the case from above.

Here, if the oil pressure control device and the electric pump are assembled from the same direction relative to the case, a reduction in the assembly time for the vehicle drive device can be expected.

In such cases, it is conceivable to arrange the electric pump upright alongside the oil pressure control device inside the opening that houses the oil pressure control device.

When arranging the electric pump upright next to the oil pressure control device (control valve), it is necessary to place the electric pump, held by a jig, in a predetermined position inside the opening.

However, if the electric pump is not stably supported when held by the jig, it can be difficult to position the electric pump in the designated location.

Therefore, an improvement in the support stability of the electric pump provided in the power transmission device is required.

One aspect of the present disclosure is a power transmission device, having a case that accommodates a power transmission mechanism, a control valve that controls oil pressure supplied to the power transmission mechanism, and an electric pump that supplies oil to the control valve, wherein the case has a first chamber that accommodates the power transmission mechanism, and a second chamber arranged adjacent to the first chamber in a horizontal direction, the control valve is arranged upright in the second chamber, oriented so that a plurality of pressure regulating valves are aligned in a vertical direction, the electric pump is provided in the second chamber so that an axis of rotation of a motor is aligned in the vertical direction, the control valve and the electric pump are arranged in the direction of the axis of rotation of the power transmission mechanism, the electric pump has a first flange section where a first arm of a jig engages, and a supported section supported by a second arm of the jig, the supported section forms a circular basic cross-sectional shape orthogonal to the axis of rotation of the motor, and the first flange section extends from an outer circumference of the supported section.

According to one aspect of the present disclosure, the support stability of the electric pump provided in the power transmission device is improved.

BRIEF DESCRIPTION OF THE DRAWINGS

Referring now to the attached drawings which form a part of this original disclosure.

DETAILED DESCRIPTION

Figure 1:
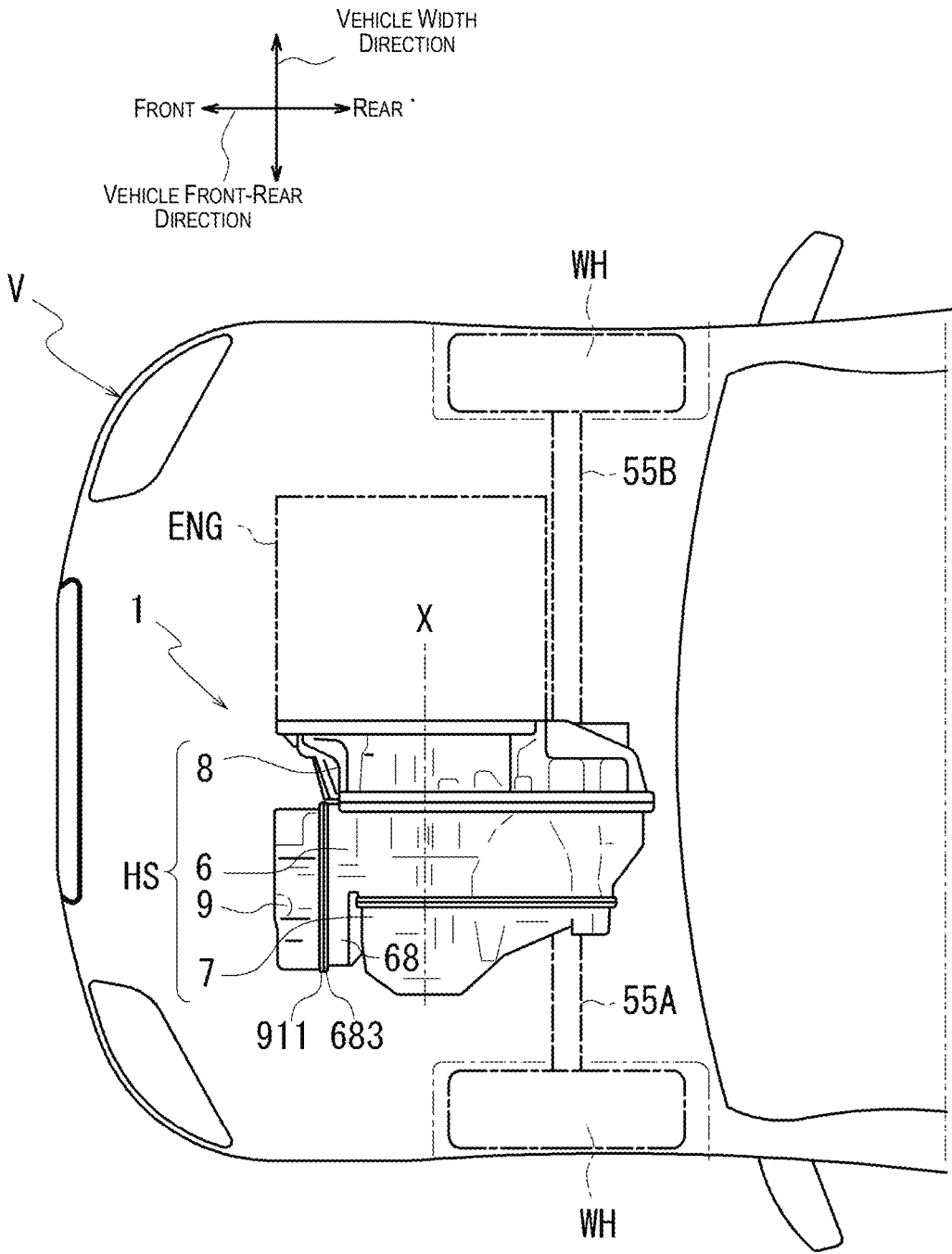
FIG. 1 is a schematic diagram showing a general configuration of the power transmission device.

First, definitions of terminology in the present specification will be explained.

A power transmission device is a device having at least a power transmission mechanism, where the power transmission mechanism is, for example, at least one of a gear mechanism, a differential gear mechanism, or a reduction gear mechanism.

In the following embodiment, a case is illustrated in which a power transmission device 1 has a function for transmitting the output rotation of an engine, but the power transmission device 1 need only transmit the output rotation of at least one of an engine or a motor (rotating electrical machine).

"Overlaps as viewed from a prescribed direction" means that a plurality of elements are arranged in a prescribed direction, and means the same as "overlapping in a prescribed direction." "Prescribed direction" is, for example, the axial direction, radial direction, direction of gravity, direction of travel of the vehicle (vehicle forward travel direction, vehicle rearward travel direction), etc.

If a plurality of elements (parts, sections, etc.) are shown arranged in a prescribed direction in the drawings, it may be assumed that there is text in the description in the specification indicating that the plurality of elements overlap when viewed in the prescribed direction.

"Not overlapping when viewed in a prescribed direction" and "offset when viewed in a prescribed direction" mean that a plurality of elements are not arranged in the prescribed direction, and mean the same as "not overlapping in a prescribed direction" and "offset in a prescribed direction." "Prescribed direction" is, for example, the axial direction, radial direction, direction of gravity, direction of travel of the vehicle (vehicle forward travel direction, vehicle rearward travel direction), etc.

If a plurality of elements (parts, sections, etc.) are shown not arranged in a prescribed direction in the drawings, it may be assumed that there is text in the description in the specification indicating that the plurality of elements do not overlap when viewed in the prescribed direction.

"As viewed from a prescribed direction, a first element (part, section, etc.) is located between a second element (part, section, etc.) and a third element (part, section, etc.)" means that when viewed from the prescribed direction, the first element can be seen between the second element and the third element. The "prescribed direction" is, for example, the axial direction, radial direction, direction of gravity, direction of travel of the vehicle (forward movement direction of the vehicle, rearward movement direction of the vehicle), etc.

For example, if the second element, the first element, and the third element are arranged in that order in the axial direction, then the first element is located between the second element and the third element when viewed from the radial direction. If the first element is shown between the second element and the third element as viewed from a prescribed direction in the drawings, it may be assumed that there is text in the description in the specification describing the first element between the second element and the third element as viewed from the prescribed direction.

When two elements (parts, sections, etc.) overlap as viewed from the axial direction, the two elements are coaxial.

"Axial direction" means the axial direction of the axis of rotation of a part making up the device. "Radial direction" means a direction orthogonally intersecting the axis of rotation of the part making up the device. The part is, for example, a motor, a gear mechanism, a differential gear mechanism, or the like.

"Upright" with reference to the control valve means that in the case of a control valve having a basic configuration with a separation plate sandwiched between valve bodies, the valve bodies of the control valve are stacked in the horizontal line direction based on the state of installation of the power transmission device in the vehicle. The "horizontal line direction" here does not mean the horizontal line direction in the strict sense, but also includes cases in which the direction of stacking is at an angle relative to the horizontal line.

Further, "upright" with respect to the control valve means that the control valve is arranged with the plurality of pressure regulating valves (valve bodies) inside the control valve aligned in the direction of a vertical line VL (direction of gravity) based on the state of installation of the power transmission device in the vehicle.

"The plurality of pressure regulating valves aligned in the direction of a vertical line VL" means that the regulating valves inside the control valve are arranged spaced out in the direction of the vertical line VL.

In this case, the plurality of pressure regulating valves need not be strictly arranged in a single file in the direction of the vertical line VL.

For example, if the control valve is formed by stacking multiple valve bodies, the plurality of pressure regulating valves may be arranged in the upright control valve in the direction of the vertical line VL, with the positions shifted in the stacking direction of the valve bodies.

Further, as viewed from the axial direction of the valve bodies provided on the pressure regulating valves (the direction of forward and backward movement), the plurality of pressure regulating valves need not be arranged with gaps in between in the direction of the vertical line VL.

As viewed from the axial direction of the valve bodies provided with the pressure regulating valves (the direction of forward and backward movement), the plurality of pressure regulating valves need not be adjacent in the direction of the vertical line VL.

Hence, if, for example, the pressure regulating valves arranged in the direction of the vertical line VL are arranged with shifted positions in the stacking direction (horizontal line direction) of the valve bodies, then cases are also included in which, as viewed from the stacking direction, the pressure regulating valves that are adjacent in the direction of the vertical line VL are provided in a partially overlapping positional relationship.

Further, that the control valve is "upright" means that the plurality of pressure regulating valves inside the control valve are arranged in the direction of movement of the valve bodies (spool valves) provided in the pressure regulating valves aligned in the horizontal line direction.

The direction of movement of the valve bodies (spool valves) in this case is not limited to the horizontal line direction in the strict sense. The direction of movement of the valve bodies (spool valves) in this case is a direction along an axis of rotation X of the power transmission device. In this case, the direction of the axis of rotation X and the sliding direction of the valve bodies (spool valves) are the same.

Embodiments of the present invention are described below.

FIG. 1 is a schematic diagram illustrating the general configuration of the power transmission device 1.

As shown in FIG. 1, the housing HS of the power transmission device 1 comprises a case 6, a first cover 7, a second cover 8, and a third cover 9.

Inside the housing HS, power transmission mechanisms such as a torque converter, a forward-reverse switching mechanism, a variator, a reduction mechanism, and a differential device, as well as a control valve CV and an electric oil pump EOP, are housed.

Here, an internal space formed between the case 6 and the second cover 8 serves as the first chamber S1, which houses the forward-reverse switching mechanism, the reduction mechanism, and the differential device. The internal space formed between the housing section 68 attached to the case 6 and the third cover 9 serves as the second chamber S2, which houses the control valve CV and the electric oil pump EOP. The internal space formed between the case 6 and the first cover 7 serves as the third chamber S3, which houses the variator.

In the power transmission device 1 mounted in the vehicle V, the output rotation of the engine ENG (drive source) is transmitted to the drive wheels WH, WH via the power transmission mechanism and through the left and right drive shafts 55A, 55B.

Figure 2:
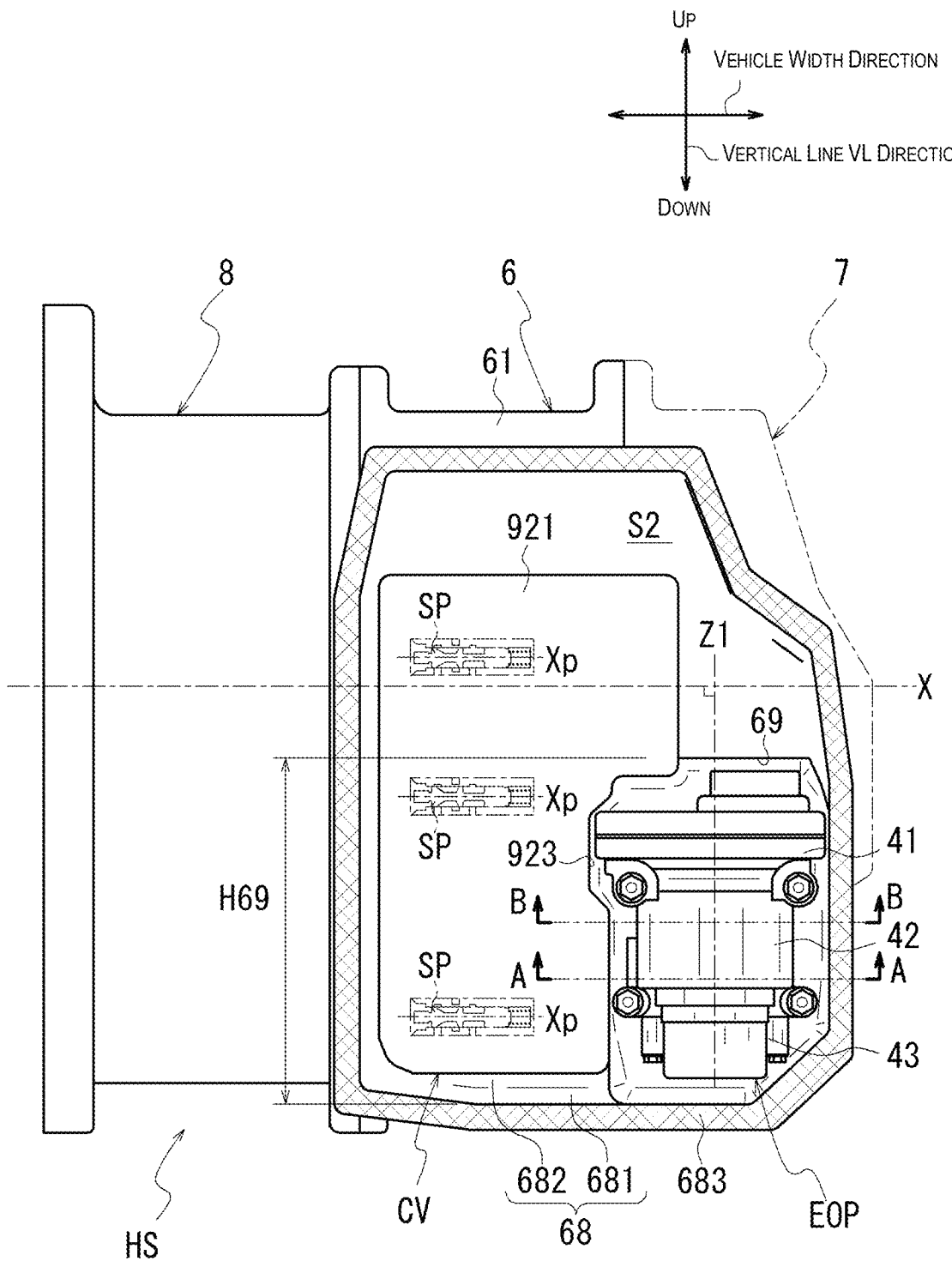
FIG. 2 is a view of the housing from the front of the vehicle.

FIG. 2 is a view of the housing HS from the front of the vehicle. In this FIG. 2, the housing section 68, as viewed from the front of the vehicle, is schematically shown along with other components of the housing HS (the case 6, the first cover 7, the second cover 8). Additionally, crosshatching is applied to the area of the joining section 683 located toward the viewer to clarify the location thereof. The appearance of the control valve CV is also shown schematically.

Figure 3:
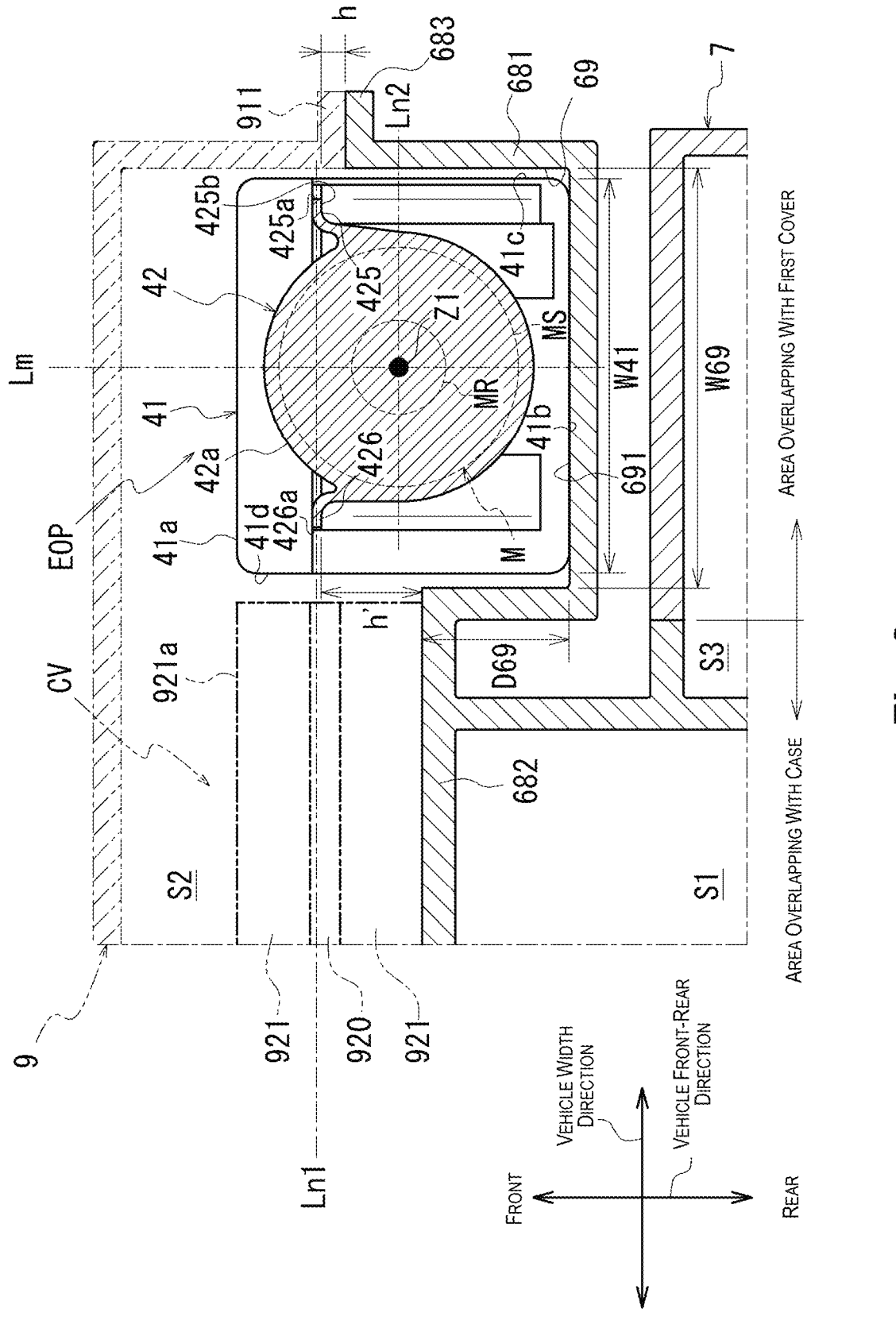
FIG. 3 is a schematic cross-sectional view of the control valve and the electric oil pump along line A-A in FIG. 2.

FIG. 3 is a schematic cross-sectional view of the control valve CV and the electric oil pump EOP along line A-A in FIG. 2.

In FIG. 3, the interior of a motor unit 42 is omitted for simplicity, and the control valve CV and the third cover 9 are indicated with dashed lines.

Figure 4:
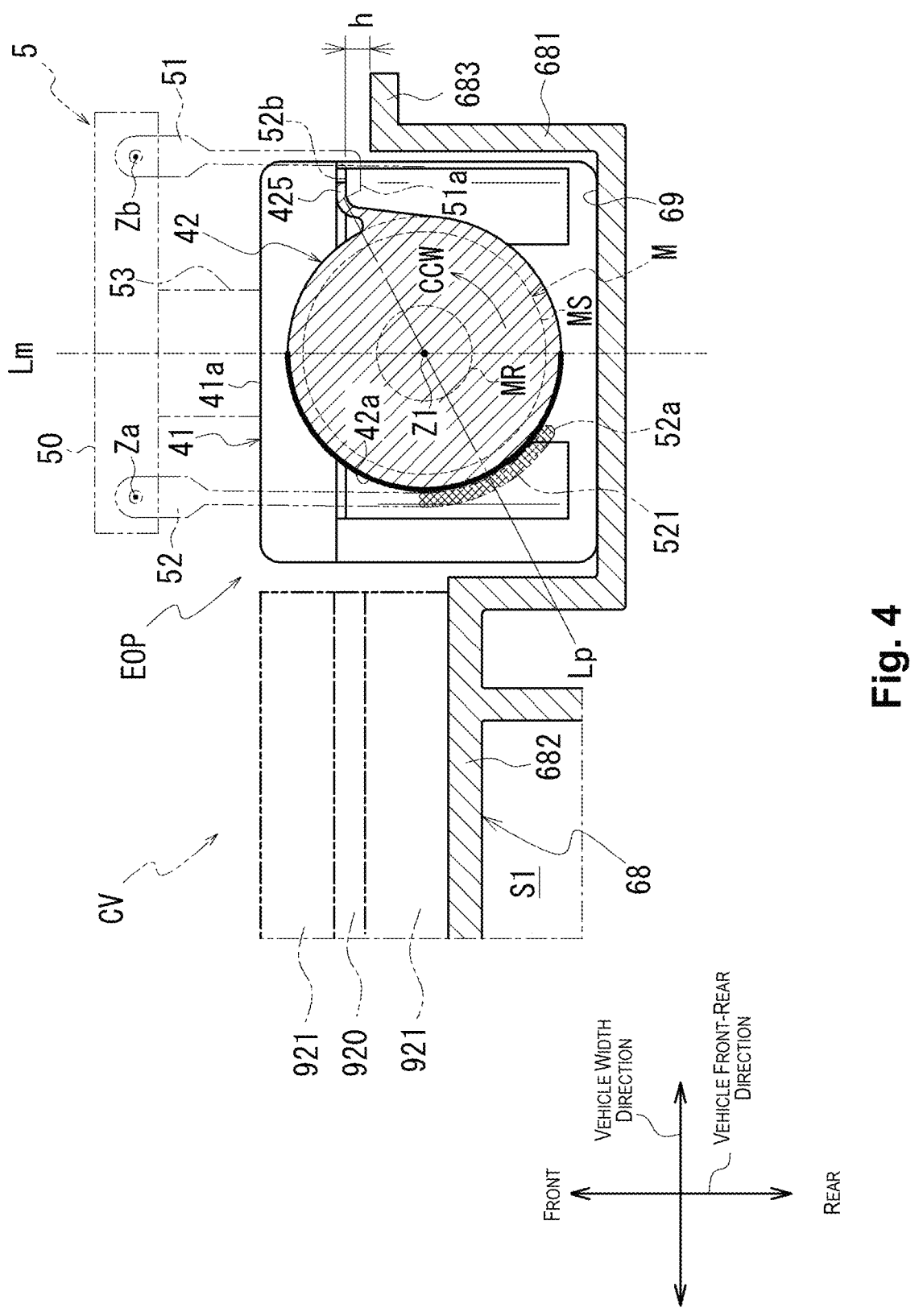
FIG. 4 is a schematic cross-sectional view of the control valve and the electric oil pump along line B-B in FIG. 2.

FIG. 4 is a schematic cross-sectional view of the control valve CV and the electric oil pump EOP along line B-B in FIG. 2.

In FIG. 4, the position of a motor M inside the motor unit 42 is approximately indicated with dashed lines, and the control valve CV and the jig 5 are shown with dashed lines.

As shown in FIG. 2, the housing section 68 is attached to a side surface of the case 6 toward the front of the vehicle.

The housing section 68 is provided with an opening facing the front side of the vehicle. The wall section 682 of the housing section 68 away from the viewer looking at the figure is provided along the axis of rotation X of the power transmission mechanism in the housing HS. As viewed from the radial direction of the axis of rotation X, the housing section 68 is formed having a range in the direction of the axis of rotation X from the region of the circumferential wall section 61 of the case 6 to the side of the first cover 7.

A region of approximately half of a wall section 682 of the housing section 68 on the second cover 8 side forms a single unit with the circumferential wall section 61 on the case 6 side. The region of approximately half of the side opposite the second cover 8 is an extension of the circumferential wall section 61, with a gap formed between same and the outer circumference of the first cover 7.

As shown in FIG. 2, when viewed from the front of the vehicle, the housing section 68 has a wall section 682 and a circumferential wall section 681 that surrounds the entire outer circumference of the wall section 682. The end surface of the circumferential wall section 681 on the side toward the viewer serves as the joining section 683 with the third cover 9.

As shown in FIGS. 1 and 3, the joining section 683 is joined along the entire circumference with the joining section 911 on the side of the third cover 9. The housing section 68 and the third cover 9 are connected by bolts not shown in the drawings, with the joining sections 683, 911 joined together.

The inside of the circumferential wall section 681 is a second chamber S2 housing the control valve CV and the electric oil pump EOP.

As shown in FIG. 3, the control valve CV has a basic structure in which a separation plate 920 is sandwiched between valve bodies 921, 921. An oil pressure control circuit (not shown in the drawings) is formed inside the control valve CV. The oil pressure control circuit is provided with a solenoid that is driven based on instructions from a control device (not shown) and pressure regulating valves (spool valves SP) that operate based on signal pressure produced by the solenoid.

As shown in FIG. 2, inside the second chamber S2, the control valve CV is upright, so that the direction of stacking of the valve bodies 921, 921 is aligned in the vehicle front-rear direction (the direction toward and away from the viewer in the diagram).

In the second chamber S2, the control valve CV is upright so as to satisfy the following conditions. (a) A plurality of spool valves SP inside the control valve CV are arranged in the direction of the vertical line VL (the vertical direction) based on the state of installation of the power transmission device 1 in the vehicle V, and (b) a direction of advancement and retraction Xp of the spool valves SP is along the horizontal direction (the left-right direction in FIG. 2).

Advancement and retraction of the spool valves SP is thus not hindered, and the control valve CV is upright in the second chamber S2. This prevents the second chamber S2 from becoming larger in the vehicle front-rear direction.

As shown in FIG. 2, when viewed from the front of the vehicle, the control valve CV forms an approximate L-shape in which an substantially rectangular valve body 921 is provided with a cutout 923. The cutout 923 is provided to avoid interference with the electric oil pump EOP.

From the front of the vehicle, part of the electric oil pump EOP on the side of the second cover 8 (left side in the diagram) is housed in the cutout 923.

Therefore, when viewed from the direction of the vertical line VL, part of the electric oil pump EOP is in a positional relationship overlapping with the control valve CV.

As shown in FIG. 2, inside the second chamber S2, the control valve CV and the electric oil pump EOP are aligned in the direction of the axis of rotation X of the power transmission mechanism (left-right direction in FIG. 2).

From the front of the vehicle, the control valve CV is in a positional relationship overlapping with the case 6. From the front of the vehicle, the electric oil pump EOP is in a positional relationship overlapping with the first cover 7.

As shown in FIG. 2, the electric oil pump EOP has a basic configuration in which a control unit 41, a motor unit 42, and a pump unit 43 are aligned in series along the axis of rotation Z1 of the motor M.

Viewed from the front of the vehicle, the electric oil pump EOP is oriented so that the axis of rotation Z1 is orthogonal to the axis of rotation X of the power transmission mechanism. In this state, the electric oil pump EOP is arranged upright with the pump unit 43 positioned on the lower side inside the second chamber S2 and the control unit 41 positioned on the upper side inside the second chamber S2.

As shown in FIG. 2, in the wall section 682 of the housing section 68, a recess 69 is provided in the region overlapping with the first cover 7 when viewed from the front of the vehicle. The recess 69 is formed to accommodate the electric oil pump EOP within a range of height H69 in the direction of the vertical line VL.

As shown in FIG. 3, the recess 69 is formed by recessing the wall section 682 toward the side of the first cover 7 (downward in the diagram). A width W69 of the recess 69 in the vehicle width direction is slightly larger than a width W41 of the control unit 41 of the electric oil pump EOP (W69>W41).

A depth D69 of the recess 69 in the vehicle front-rear direction is set so that a flange section 425, which will be described below, is positioned toward the front of the vehicle relative to the joining section 683 of the housing section 68, and the axis of rotation Z1 of the motor is positioned toward the front of the vehicle relative to the wall section 682.

In this embodiment, by housing part of the electric oil pump EOP inside the recess 69, a side edge 41a on the front side of the vehicle of the electric oil pump EOP (control unit 41), and a side edge 921a on the front side of the vehicle of the control valve CV (valve body 921) are positioned to be approximately coplanar. This prevents the second chamber S2 from increasing in size toward the front of the vehicle.

Figure 5:
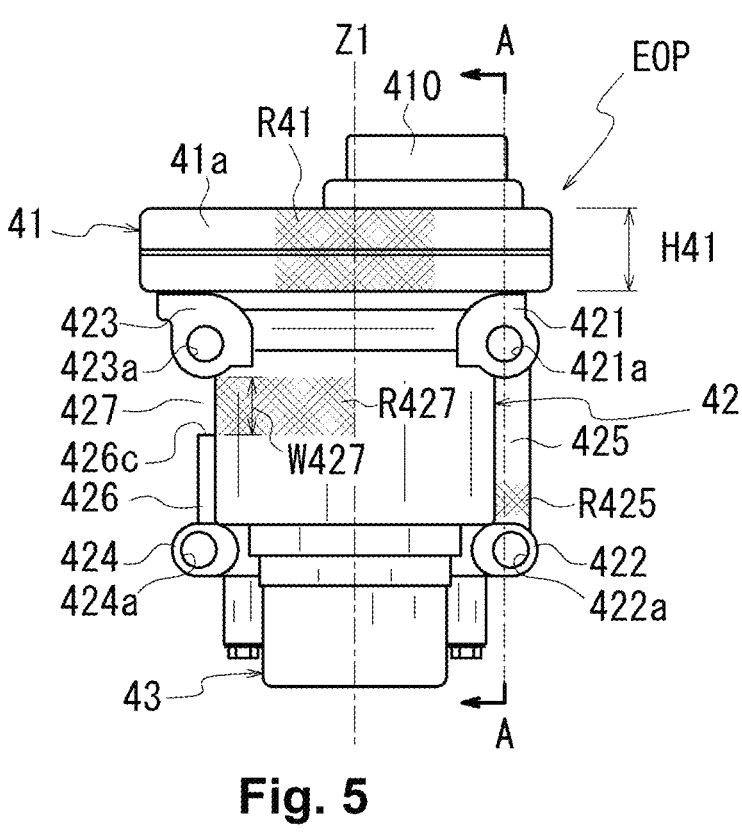
FIG. 5 is a front view of the electric oil pump.

FIG. 5 is a front view of the electric oil pump EOP. FIG. 5 schematically shows the state of the electric oil pump EOP positioned in the second chamber S2 as viewed from the front of the vehicle.

Figure 6:
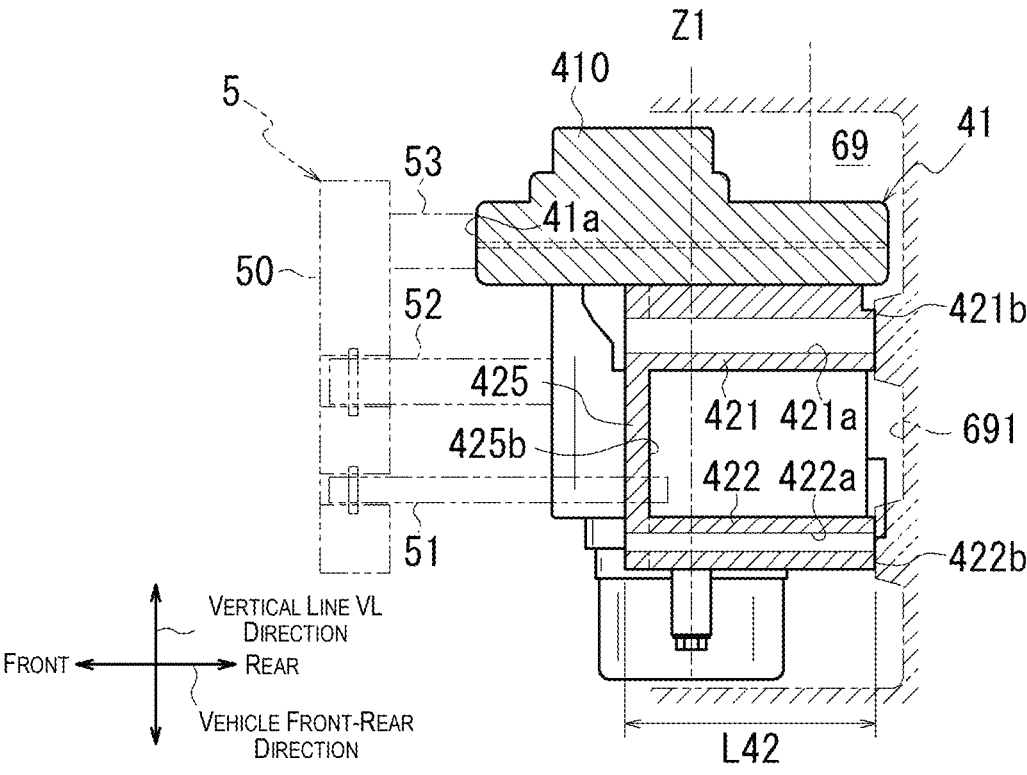
FIG. 6 is a side view showing a part of the electric oil pump in cross-section.

FIG. 6 is a side view showing a part of the electric oil pump EOP in cross-section. Note that FIG. 6 schematically shows a cross-section of the electric oil pump EOP along line A-A in FIG. 5.

In the following description, the positional relationships of the components of the electric oil pump EOP are explained using directions based on the installed state of the power transmission device 1 in the vehicle V, as necessary.

As shown in FIG. 3, the control unit 41 of the electric oil pump EOP forms an approximately rectangular shape when viewed from the direction of the axis of rotation Z1. As shown in FIG. 5, when viewed from the radial direction of the axis of rotation Z1, the control unit 41 has a thickness H41 in the direction of the axis of rotation Z1. The side edge 41a on the side facing the viewer of the control unit 41 forms a flat surface that comes into contact with the contact section 53 of the jig 5, which will be described later (see FIG. 6).

As shown in FIG. 6, the side edge 41a of the control unit 41 forms a substantially flat surface parallel to an engaging surface 425b of the flange section 425 to be described later. In FIG. 6, the side edge 41a and the engaging surface 425b are parallel to the axis of rotation Z1.

Note that an area R41 with crosshatching in FIG. 5 is the area where the contact section 53 comes into contact. This area is set to cross the axis of rotation Z1 of the motor M in a direction orthogonal to the axis of rotation Z1 (left-right direction in FIG. 5).

Inside the control unit 41, a control board for driving the motor (not shown in the drawings) is housed. On the surface opposite the motor unit 42 (upper side in the diagram), the control unit 41 is equipped with a connection part 410 for a power supply line.

A rotor core MR and a stator core MS that surrounds the outer circumference of the rotor core MR are housed inside the motor unit 42. Therefore, the motor unit 42 has a basic cross-sectional shape that is circular, orthogonal to the axis of rotation Z1 (see FIG. 3).

The term "basic shape" in this specification refers to the fundamental shape that the motor unit 42 has, or the basic shape necessary to ensure the functionality of the motor unit 42.

For example, as shown in FIG. 4, the rotor core MR of the motor M has a circular external shape in the cross-section orthogonal to the axis of rotation Z1. The stator core MS of the motor M has a shape that can surround the entire circumference of the rotor core MR. Therefore, the outer diameter of the stator core MS of the motor M in the cross-section orthogonal to the axis of rotation Z1 is also circular. Thus, the necessary cross-sectional shape of the motor unit 42 for housing the motor M is circular.

In the case of FIG. 4, due to the presence of the flange section 425, which will be described later, the cross-sectional shape of the motor unit 42 shown in FIG. 4 is not circular. However, the flange section 425 is unrelated to the necessary cross-sectional shape of the motor unit 42 for housing the motor M. Therefore, in FIG. 4, the basic cross-sectional shape of the motor unit 42 can be said to be circular.

Similarly, in the case of FIG. 3, due to the presence of the flange sections 425 and 426 described later, the cross-sectional shape of the motor unit 42 shown in FIG. 3 is not circular. However, the flange sections 425 and 426 are unrelated to the necessary cross-sectional shape of the motor unit 42 for housing the motor M. Therefore, in FIG. 3, the basic cross-sectional shape of the motor unit 42 can be said to be circular.

In this embodiment, the outer circumference of the motor unit 42 is supported by the second arm 52 of the jig 5 described later. Therefore, the term "shape of the cross-section orthogonal to the axis of rotation of the motor in the supported part" refers to the cross-sectional shape of the area supported by the second arm 52 in the motor unit 42, i.e., at least the cross-sectional shape on the side supported by the second arm 52 (the cross-sectional shape of the area to the left of the straight line Lm in FIG. 4). Thus, "having a basic cross-sectional shape that is circular" means, in the case of FIG. 4, that the basic shape is circular or arc-shaped.

As shown in FIG. 5, from the front of the vehicle, boss sections 421 and 423 are provided at the boundary with the control unit 41 in the motor unit 42. Additionally, boss sections 422 and 424 are provided at the boundary with the pump unit 43.

As shown in FIG. 6, the boss sections 421, 422 extend linearly in the assembly direction of the electric oil pump EOP (in the vehicle front-rear direction in FIG. 6). The boss sections 421, 422 are formed with a length L42 such that the tips 421b and 422b of the boss sections 421, 422 contact the bottom wall section 691 inside the recess 69 of the housing section 68.

The boss sections 421, 422 are provided with bolt insertion holes 421a and 422a.

The boss sections 423, 424, which are positioned hidden on the side away from the viewer in FIG. 6, also have a similar configuration to the boss sections 421, 422. These boss sections 423, 424 are also equipped with bolt insertion holes 423a and 424a (see FIG. 5).

The electric oil pump EOP is fixed to the bottom wall section 691 of the housing section 68 by bolts (not shown in the drawings) that pass through the insertion holes 421a to 424a.

When viewed from the radial direction of the axis of rotation Z1 (front side of the vehicle in FIG. 5), the boss sections 421, 422, and the boss sections 423, 424, are positioned symmetrically around the axis of rotation Z1.

In the installed state of the electric oil pump EOP in the second chamber S2, the boss sections 423, 424 are positioned closer to the control valve CV than boss sections 421, 422.

As shown in FIGS. 5 and 6, on one side of the axis of rotation Z1, a flange section 425 is provided on the outer circumference of the motor unit 42.

The flange section 425 is positioned between the boss sections 421, 422 and is a plate-like section that spans across the boss sections 421, 422.

As shown in FIG. 3, the flange section 425 extends in the direction away from the straight line Lm (the direction away from the control valve CV) along the straight line Ln1. Here, the straight line Lm runs along the assembly direction of the electric oil pump EOP and passes through the axis of rotation Z1 of the motor M. The straight line Ln1 is orthogonal to the straight line Lm and extends in the vehicle width direction. The straight line Ln1 is parallel to the side edges 41a, 41b of the control unit 41. Note that the straight line Ln1 is parallel to the straight line Ln2. The straight line Ln2 passes through the center of the motor unit 42 in cross-section (axis of rotation Z1) and extends in the vehicle width direction along the bottom wall section 691.

As shown in FIG. 3, when viewed from the direction of the axis of rotation Z1, a tip 425$a$ of the flange section 425 is positioned slightly inward (toward the straight line Lm) relative to the side edge 41$c$ of the control unit 41.

When the electric oil pump EOP is housed in the recess 69, the flange section 425 is positioned on the side of the third cover 9 (upper side in the diagram), farther from the joining section 683 of the circumferential wall section 681. In this state, the flange section 425 is positioned a height h away from the joining section 683.

The lower surface of the flange section 425 on the side of the joining section 683 serves as an engaging surface 425$b$, where a claw section 51$a$ of the jig 5 to be described later engages (see FIG. 4). The engaging surface 425$b$ is parallel to the side edge 41$a$ of the control unit 41.

In the motor unit 42, a flange section 426 is also provided on the opposite side of the flange section 425 (side of the control valve CV) when viewed from the straight line Lm. The flange section 426 is also a plate-like section provided on the outer circumference of the motor unit 42.

The flange section 426 extends in the direction away from the straight line Lm along the straight line Ln1. When viewed from the direction of the axis of rotation Z1, the tip 426$a$ of the flange section 426 is positioned inward (toward the straight line Lm) relative to the side edge 41$d$ of the control unit 41.

When the electric oil pump EOP is housed in the recess 69, the flange section 426 is positioned on the side of the third cover 9 (upper side in the diagram), farther from the wall section 682. In this state, the flange section 426 is positioned a height h' away from the wall section 682.

As shown in FIG. 5, the flange section 426 extends along the axis of rotation Z1 from the boss section 424 toward the boss section 423. The tip 426$c$ of the flange section 426 faces the boss section 423 with a gap 427 therebetween. This gap 427 is formed with a width W427 that allows the second arm 52 of the jig 5, to be described later, to pass through. Therefore, the gap 427 between the flange section 426 and the boss section 423 is a passable gap for the second arm 52 of the jig 5.

The electric oil pump EOP is gripped using a dedicated jig 5 when being installed in the recess 69 inside the second chamber S2.

As shown in FIG. 4, in the electric oil pump EOP, the side edge 41$a$ of the control unit 41, the flange section 425, and the outer circumference 42$a$ of the motor unit 42 are parts that can be involved in gripping using the jig 5.

The jig 5 has a first arm 51 with the claw section 51$a$ that engages with the flange section 425, the second arm 52 with a support region 521 that supports the outer circumference 42$a$ of the motor unit 42, and the contact section 53 that contacts the side edge 41$a$ of the control unit 41.

The tip 52$a$ side of the second arm 52 serves as the support region 521 for the outer circumference 42$a$ of the motor unit 42. This support region 521 forms an arc shape along the outer circumference of the motor unit 42.

When the electric oil pump EOP is gripped by the jig 5, the support region 521 is provided across a range that cuts across the straight line Lp in the circumferential direction around the axis of rotation Z1.

Here, the straight line Lp is a straight line that connects the axis of rotation Z1 and the support point of the claw section 51$a$ on the first arm 51 in the motor unit 42, corresponding to the diameter line of the motor unit 42.

The tip 52$a$ of the second arm 52 slides along the outer circumference 42$a$ of the motor unit 42 when gripping and releasing the grip of the electric oil pump EOP by the jig 5.

Therefore, at least the surface of the region of the outer circumference 42$a$ of the motor unit 42 where the tip 52$a$ of the second arm 52 slides is formed in an arc shape centered on the axis of rotation Z1 in cross-section (the area indicated by the bold line in FIG. 4).

The first arm 51 and the second arm 52 are supported rotatably around axes Zb, Za at a common base 50. The first arm 51 and the second arm 52 are capable of rotating around the axes Zb, Za by an actuator not shown in the drawings.

When viewed from the direction of the axes Zb, Za, the contact section 53 is positioned between the first arm 51 and the second arm 52.

As shown in FIG. 6, in the jig 5, the first arm 51, second arm 52, and the contact section 53 are arranged offset in the direction of the axis of rotation Z1 of the motor.

Installation of the electric oil pump EOP in the recess 69 using the jig 5 is described below.

Figure 7:
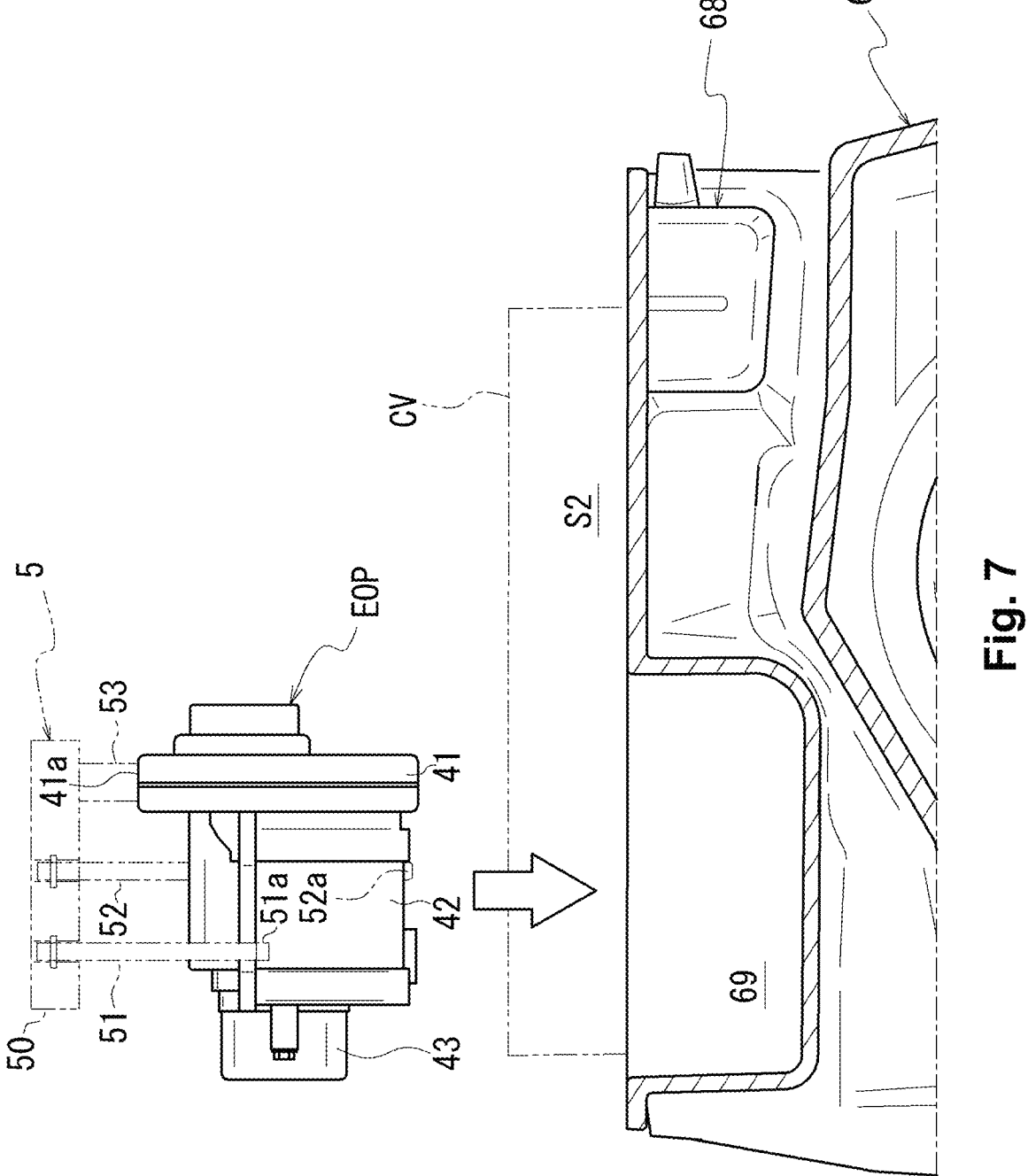
FIG. 7 is a diagram illustrating the installation of the electric oil pump inside the housing chamber using a jig.

FIG. 7 is a diagram illustrating the installation of the electric oil pump EOP in the recess 69 using the jig 5.

Figure 8:
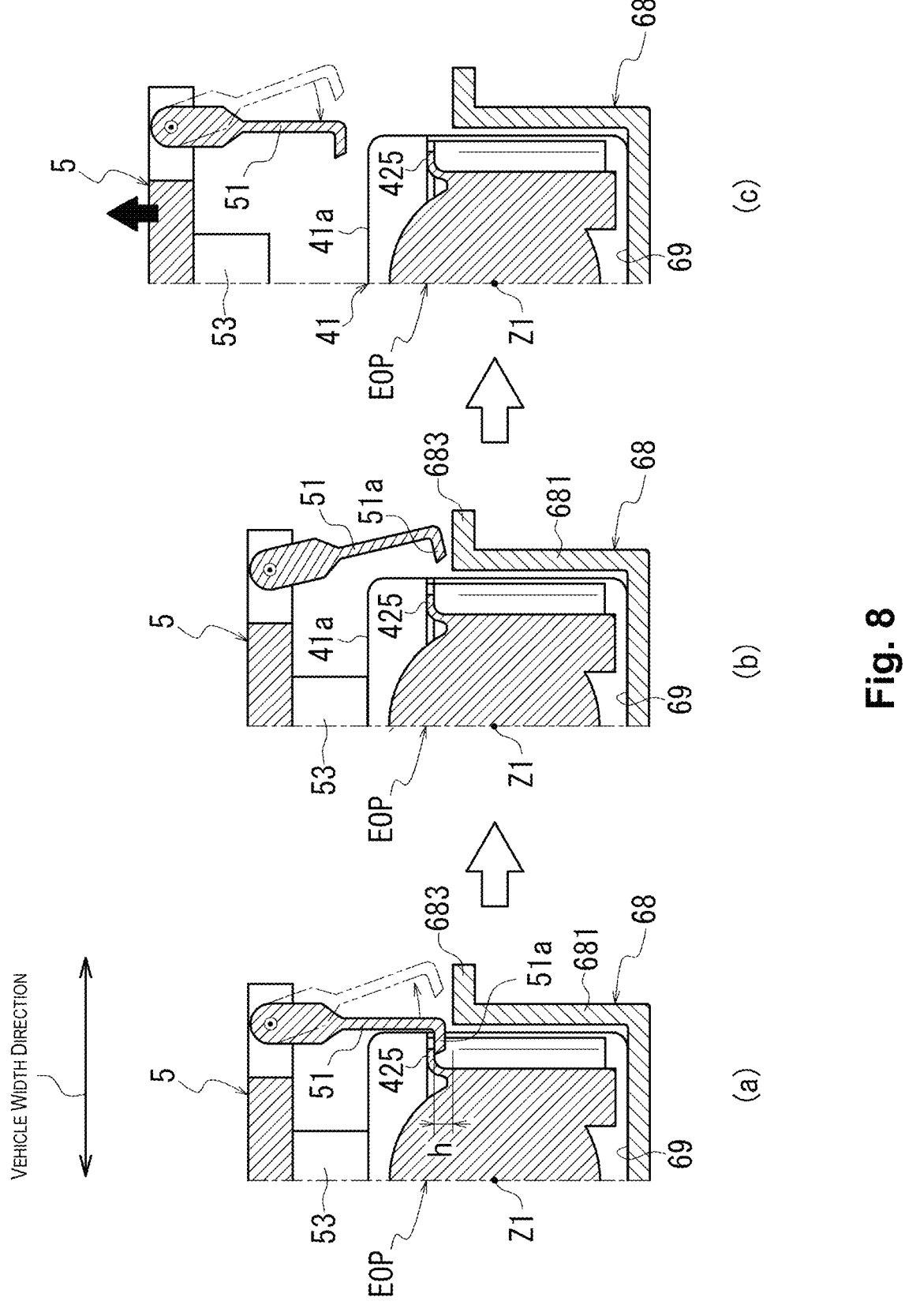
FIG. 8 is a diagram illustrating the displacement of the first arm after the electric oil pump is installed in a recess.

FIG. 8 is a diagram illustrating the displacement of the first arm 51 after the electric oil pump EOP is installed in the recess 69.

Figure 9:
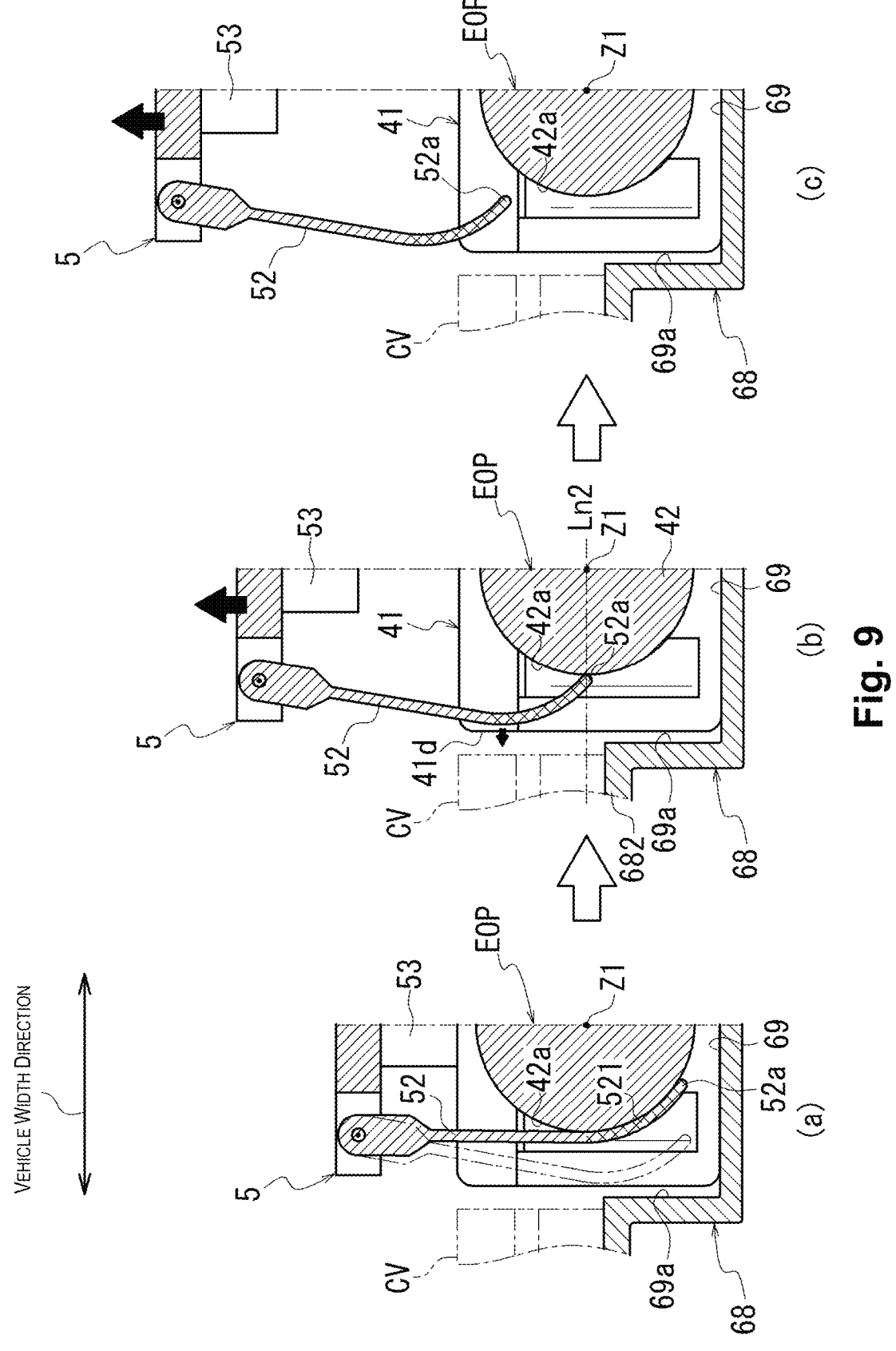
FIG. 9 is a diagram explaining the displacement of the second arm after the electric oil pump is installed in a recess.

FIG. 9 is a diagram illustrating the displacement of the second arm 52 after the electric oil pump EOP is installed in the recess 69.

Initially, when the electric oil pump EOP is gripped with the jig 5, as shown in FIG. 4, the claw section 51$a$ of the first arm 51 engages with the flange section 425 of the electric oil pump EOP.

The claw section 51$a$ protrudes from the lower end of the first arm 51 toward the second arm 52. The upper surface 52$b$ of the claw section 51$a$ is a flat surface that can contact the engaging surface 425$b$ of the flange section 425 (see FIG. 3).

The claw section 51$a$ of the first arm 51 engages in surface contact with the engaging surface 425$b$ of the flange section 425. As shown in FIG. 5, the engaging surface 425$b$ away from the viewer of the area R425 with crosshatching in the flange section 425 is supported by the claw section 51$a$ of the first arm 51.

The support region 521 of the second arm 52 supports the outer circumference 42$a$ of the motor unit 42 (see FIG. 4). The contact section 53 contacts the side edge 41$a$ of the control unit 41 (see FIG. 4).

In this state, of the outer circumference 42$a$ of the motor unit 42, the outer circumference 42$a$ located away from the viewer in the area R427 with crosshatching in FIG. 5, is supported by the support region 521 of the second arm 52. The contact section 53 contacts the area R41 of the control unit 41 (the area with crosshatching in FIG. 5).

When the jig 5 is lifted in this state, a moment in the direction rotating the electric oil pump EOP (counterclockwise CCW direction in FIG. 4) acts on the electric oil pump EOP from the engaging point of the claw section 51$a$ on the first arm 51.

This moment acts in the direction rotating the electric oil pump EOP shown in FIG. 5 around the axis of rotation Z1. Here, the contact section 53 of the jig 5 contacts the side edge 41$a$ of the control unit 41 in the area R41. This area R41 spans across the axis of rotation Z1 from the flange section 425 on one side of the axis of rotation Z1 to the flange section 426 on the other side. In FIG. 5, the operational force from the claw section 51$a$ acts on the flange section 425. However, the contact section 53 of the jig 5 contacts the area R41 that extends up to the flange section 425 side from the axis of rotation Z1. Therefore, the rotation of the motor unit 42 around the axis of rotation Z1 is restricted by the contact section 53 contacting the control unit 41. Thus, the rotation of the electric oil pump EOP is restricted by the contact section 53.

When the jig 5 is further lifted in this state, a load acts on the electric oil pump EOP in the direction away from the first arm 51 (left direction in FIG. 4).

Here, the support region 521 of the second arm 52 supports the outer circumference 42a of the motor unit 42 on the opposite side of the engaging point of the claw section 51a on the first arm 51. Therefore, the movement of the electric oil pump EOP away from the first arm 51 is restricted by the support region 521.

Furthermore, as shown in FIG. 5, the second arm 52 is positioned inside the gap 427 between the flange section 426 and the boss section 423. Therefore, the relative movement in the direction of the axis of rotation Z1 between the jig 5 and the electric oil pump EOP is also restricted.

Thus, the electric oil pump EOP, when gripped by the jig 5, is stabilized without significant wobbling, and the relative movement thereof with the second arm 52 is restricted.

When installing the electric oil pump EOP, gripped by jig 5, inside the housing section 68 (inside the second chamber S2), as shown in FIG. 7, the case 6 is held with the opening of the housing section 68 facing upwards. In this state, after installing the control valve CV, the electric oil pump EOP gripped by the jig 5 is moved from above downwards to be installed inside the recess 69.

Once the installation of the electric oil pump EOP into the recess 69 is completed, the claw section 51a of the first arm 51 is positioned between the housing section 68 (joining section 683) and the flange section 425 (see FIG. 8(a)). Specifically, since there is a gap of a height h between the housing section 68 and the flange section 425, the claw section 51a is positioned inside this height h gap.

In this state, the first arm 51 is displaced by an actuator not shown in the drawings to move the claw section 51a away from the flange section 425. Since the joining section 683 is not positioned outside the claw section 51a, the claw section 51a disengages from the flange section 425 without interfering with the joining section 683. This releases the support of the flange section 425 by the claw section 51a (see FIG. 8(b)).

When the jig 5 is moved in the direction away from the electric oil pump EOP (upward in the diagram), the contact section 53 moves away from the side edge 41a of the control unit 41.

When the jig 5 is moved in a direction away from the electric oil pump EOP (upward in the diagram), the tip 52a of the second arm 52 displaces upward while sliding along the outer circumference 42a of the motor unit 42 (see FIGS. 9(a), (b)).

Consequently, the second arm 52 displaces in the direction away from the axis of rotation Z1 (toward the control valve CV).

The point when the tip 52a reaches the position intersecting the straight line Ln2 is the point where the second arm 52 is closest to the control valve CV.

In this embodiment, when the tip 52a reaches the position where it intersects the straight line Ln2, the second arm 52 is set not to reach outside the side edge 41d of the control unit 41 relative to the position of the motor unit 42 and the control unit 41.

Here, the side edge 41d of the control unit 41 is positioned close to the side edge 69a of the recess 69 on the control valve CV side of the vehicle. Therefore, the side edge 41d of the control unit 41 is also positioned close to the control valve CV located on the side edge 69a side.

As noted above, when the tip 52a of the second arm 52 reaches the position intersecting the straight line Ln2, the second arm 52 does not extend beyond the side edge 41d of the control unit 41, so the second arm 52 does not reach beyond the recess 69 to the area of the wall section 682.

This configuration releases the gripping of the electric oil pump EOP by the jig 5 and prevents the second arm 52, which displaces toward the control valve CV side, from interfering with the control valve CV installed on the wall section 682 when the jig 5 is moved away from the electric oil pump EOP (in the upward direction as shown in the diagram).

Thus, the second arm 52, positioned on the control valve CV side, does not displace outward beyond the electric oil pump EOP (control unit 41) when viewed from the direction of the axis of rotation Z1 (see FIG. 9(b)), allowing the electric oil pump EOP and the control valve CV to be positioned closer together.

Furthermore, the first arm 51, positioned on the side opposite the control valve CV, as shown in FIG. 8, positions the claw section 51a in the gap between the flange section 425 on the side of the electric oil pump EOP (control unit 41) and the joining section 683 of the housing section 68 when viewed from the direction of the axis of rotation Z1, and therefore, even if the claw section 51a is displaced in the direction away from the flange section 425 (to the right in the diagram), the claw section 51a does not interfere with the circumferential wall section 681 (joining section 683) of the housing section 68 side. This allows the electric oil pump EOP to be positioned close to the circumferential wall section 681 of the recess 69.

Therefore, when installing the electric oil pump EOP in the second chamber S2 (recess 69), there is no need to significantly expand the second chamber S2 in the vehicle width direction.

Note that in the embodiment, an example is illustrated where the flange section 425 spans across both the boss section 421 and the boss section 422 (see FIG. 5). The flange section 425 may be provided without connecting to either the boss section 421 or the boss section 422.

Furthermore, the flange section 425 may be connected to at least either the boss section 421 or the boss section 422. In this case, if the claw section 51a of the first arm 51 of the jig 5 engages closer to the boss section 422, the flange section 425 is connected to the boss section 422. If the claw section 51a of the first arm 51 of the jig 5 engages closer to the boss section 421, the flange section 425 is connected to the boss section 421.

That is, by changing the boss section to which the flange section 425 connects depending on the position where the claw section 51a of the first arm 51 of the jig 5 engages, the rigidity of the flange section 425 can be ensured.

Additionally, in the embodiment, an example is illustrated where the flange section 426 is connected only to the boss section 424. The flange section 426 may also be positioned between the boss section 423 and the boss section 424 without connecting to the boss section 424. The flange section 426 restricts the displacement of the second arm 52 in the direction of the axis of rotation Z1. Therefore, by positioning the flange section 425 between the boss sections 423, 424 while ensuring a passable gap 427 for the second arm 52, the displacement of the second arm 52 in the direction of the axis of rotation Z1 can be restricted.

Additionally, the position of the gap 427 in the flange section 426 may be adjusted in the direction of the axis of rotation Z1 depending on the area supported by the second arm 52 of the jig 5 in the motor unit 42, and the flange section 426 may be connected to both of the boss sections 423, 424.

Furthermore, in the embodiment, an example is illustrated where the second arm 52 is positioned on the control valve CV side when viewed from the direction of the axis of rotation Z1. If there is extra space between the control valve CV and the electric oil pump EOP, the first arm 51 may also be positioned on the control valve CV side.

As described above, the power transmission device 1 according to this embodiment has the following configuration.

(1) The power transmission device 1 has the housing HS (case) that accommodates the power transmission mechanism, the control valve CV that controls the oil pressure supplied to the power transmission mechanism, then electric oil pump EOP (electric pump) that supplies oil to the control valve.

The housing HS has the first chamber S1 that accommodates the power transmission mechanism, and the second chamber S2 that is arranged adjacent to the first chamber S1 in the horizontal line HL direction.

The control valve CV is arranged upright inside the second chamber S2, aligning multiple pressure regulating valves in the vertical line VL direction (vertical direction).

The electric oil pump EOP is provided inside the second chamber S2, aligning the axis of rotation Z1 of the motor M with the vertical line VL direction (vertical direction).

The control valve CV and the electric oil pump EOP are aligned in the axis of rotation X direction of the power transmission device 1.

The electric oil pump EOP has the flange section 425 (first flange section) where the first arm 51 of the jig 5 engages, and the motor unit 42 (supported part) that is supported by the second arm 52 of the jig 5.

The motor unit 42 has a basic cross-sectional shape that is circular, orthogonal to the axis of rotation Z1 of the motor M.

The flange section 425 extends from the outer circumference 42a of the motor unit 42.

Simply supporting the motor unit 42 of the electric oil pump EOP with the second arm 52 of the jig 5 allows for rotation of the electric oil pump EOP around the axis of rotation Z1 of the motor.

By having the electric oil pump EOP equipped with a flange section 425 extending from the outer circumference 42a of the motor unit 42, engaging the claw section 51a of the first arm 51 with the flange section 425 when gripping the electric oil pump EOP with the jig 5 can restrict the rotation of the electric oil pump EOP.

This improves the stability of the support of the electric oil pump EOP by the jig 5 when installing the electric oil pump EOP in the second chamber S2 using the jib 5, allowing for precise positioning of the electric oil pump EOP inside the limited space of the second chamber S2.

(2) The flange section 425 extends in the direction away from the control valve CV, starting from the area on the opposite side of the control valve CV in the motor unit 42.

To grip the electric oil pump EOP with the jig 5, space for the displacement of the first arm 51 needs to be ensured outside the extension direction of the flange section 425.

If the flange section 425 is provided on the side of the control valve CV, space for the displacement of the first arm 51 between the control valve CV and the electric oil pump EOP needs to be ensured to grip the electric oil pump EOP with the jig 5.

If the flange section 425 is provided on the side opposite the control valve CV, the electric oil pump EOP can be positioned closer to the control valve CV. This allows for ensuring the necessary space to grip the electric oil pump EOP with the jig 5 without needing to increase the size of the second chamber S2, thus preventing an increase in size of the housing HS.

(3) The second chamber S2 is a space surrounded by
    the circumferential wall section 681 that surrounds the outer circumference of the control valve CV and the electric oil pump EOP,
    the third cover 9 (cover part) that joins to the circumferential wall section 681 and seals the opening of the circumferential wall section 681, and
    the wall section 682 (partition wall) that divides the first chamber S1 and the second chamber S2.

In a cross-section along the opening direction of the circumferential wall section 681, the flange section 425 is positioned on the side of the third cover 9 relative to the circumferential wall section 681.

With this configuration, even if the flange section 425 is positioned closer to the circumferential wall section 681 when viewed from the opening direction of the circumferential wall section 681, space for the displacement of the first arm 51 can be ensured outside the extension direction of the flange section 425.

This allows for ensuring the necessary space to grip the electric oil pump EOP with the jig 5 without needing to increase the size of the second chamber S2, thus preventing an increase in size of the housing HS.

(4) In the electric oil pump EOP, the boss section 421 (first boss section) and the boss section 422 (second boss section) are provided spaced apart in the direction of the axis of rotation Z1 of the motor M.

The flange section 425 is located between the boss sections 421 and 422.

In the electric oil pump EOP, there is unused space between the boss section 421 and the boss section 422, outside the radial direction of the axis of rotation Z1 of the motor M. By utilizing this unused space to provide the flange section 425, the electric oil pump EOP can be appropriately prevented from increasing in size in the radial direction of the axis of rotation Z1.

(5) The flange section 425 is connected to the boss section 422.

The claw section 51a of the first arm 51 of the jig 5 engages with the flange section 425. Therefore, when lifting the electric oil pump EOP gripped by the jig 5, a load acts on the flange section 425.

Because the flange section 425 is connected to the boss section 422, the rigidity of the flange section 425 is higher compared to when the flange section 425 is not connected to the boss section 422. Thus, the support stability of the electric oil pump EOP when the electric oil pump EOP is lifted by the jig 5 is improved.

Particularly, when the claw section 51a of the first arm 51 supports the position near the boss section 422 in the flange section 425, the rigidity of the parts involved in supporting the electric oil pump EOP can be locally increased, thus improving the support stability of the electric oil pump EOP.

(6) The flange section 425 is provided spanning across both the boss section 421 and the boss section 422.

The claw section 51a of the first arm 51 of the jig 5 engages with the flange section 425. Therefore, when lifting the electric oil pump EOP gripped by the jig 5, a load acts on the flange section 425.

Because the flange section 425 is provided spanning across both the boss section 421 and the boss section 422, the rigidity of the flange section 425 is higher compared to when it is not connected. Thus, the support stability of the electric oil pump EOP when the electric oil pump EOP is lifted by the jig 5 is improved.

(7) In the electric oil pump EOP, the boss section 423 (third boss section) and the boss section 424 (fourth boss section) are provided spaced apart in the direction of the motor's axis of rotation Z1.

The boss section 423 and the boss section 424 are positioned on the side opposite the boss section 421 and the boss section 422, across the axis of rotation Z1 of the motor.

Between the boss section 423 and the boss section 424, the flange section 426 (second flange section) is provided.

The flange section 426 extends along the axis of rotation Z1 from the boss section 424, which is on the same side as the boss section 422 in the direction of the axis of rotation Z1 of the motor, toward the boss section 423, which is on the same side as the boss section 421 in the direction of the axis of rotation Z1 of the motor M.

At the flange section 426, a gap 427 is provided between the boss section 423 and the tip 426c on the side of the boss section 423

The gap 427 has a width W427 in the direction of the motor's axis of rotation Z1 of the motor M that allows the second arm 52 of the jig 5 to pass through.

With this configuration, the gap 427 is formed between the boss section 423 and the flange section 426. The second arm 52 can be inserted into this gap 427 to support the motor unit 42 using the second arm 52.

Since the boss section 423 and the flange section 426 restrict the displacement of the second arm 52 in the direction of the axis of rotation Z1 of the motor, the support stability of the electric oil pump EOP is improved.

Furthermore, by offsetting the support position of the first arm 51 and the support position of the second arm 52 in the direction of the axis of rotation Z1 of the motor, the support stability of the electric oil pump EOP is enhanced.

(8) The electric oil pump EOP has
   a side edge 41a that serves as a contacted part for the contact section 53 of the jig 5.

The side edge 41a is a flat surface that is parallel to the straight line Ln2, which passes through the axis of rotation Z1 of the motor, when viewed from the direction of the axis of rotation Z1 of the motor. The flat surface of the contact section 53 and the engaging surface (engaging surface 425b) of the flange section 425 are formed almost parallel.

When gripping the electric oil pump EOP with the jig 5, the first arm 51 engages with the flange section 425, and the support region 521 of the second arm 52 supports the outer circumference 42a of the motor unit 42.

At this point, by having the contact section 53 of the jig 5 side contact the side edge 41a, which is the contacted part on the electric oil pump EOP side, the rotation of the electric oil pump EOP can be reliably restricted. Furthermore, since the flat surface of the contact section 53 and the engaging surface of the flange section 425 are formed almost parallel, it is less likely for a moment to occur on the electric oil pump EOP, making it less prone to rotational movement. This enhances the support stability of the electric oil pump EOP in the jig 5, allowing for precise positioning of the electric oil pump EOP inside the limited space of the second chamber S2.

In the foregoing embodiment, a case was illustrated in which the power transmission device 1 transmits rotation of the engine ENG to the drive wheels WH, WH, but it is also possible for the power transmission device 1 to transmit the rotation of at least either the engine ENG or the motor (rotary electric motor) to the drive wheels WH, WH. For example, it is possible to use a single-motor, double-clutch power transmission device (in which the motor is arranged between the engine ENG and the power transmission device, a first clutch is disposed between the engine ENG and the motor, and a second clutch is arranged inside the power transmission device 1).

Further, in the foregoing embodiment, a case was illustrated in which the power transmission device 1 has a shifting function, but it is also possible for the power transmission device simply to reduce speed (or increase speed) and not have a shifting function. If the power transmission device does not have a shifting function and instead reduces and transmits rotation of the motor to the drive wheels WH, WH, the oil pressure control circuit for supplying the oil OL for cooling the motor and the oil OL for lubricating the reduction mechanism is arranged in the second chamber S2 with the electric oil pump EOP. Further, in the foregoing embodiment, a case was illustrated in which the control unit of the power transmission device 1 was provided with the control valve CV, but if the power transmission device 1 does not have a shifting mechanism and the drive source is a motor (rotary electric motor) and not the engine ENG, then the control unit may be provided with an inverter or the like for controlling driving of the motor.

Embodiments of the present invention have been described above, but the present invention is not limited only to those aspects shown in the embodiments. The present invention may be modified as deemed appropriate within the scope of the technical concept of the invention.

EXPLANATION OF THE REFERENCE
SYMBOLS

1 Power transmission device; 41 Control unit; 41a Side edge (contacted part); 42 Motor unit (supported part); 42a Surface (outer circumference); 421 Boss section (first boss section); 422 Boss section (second boss section); 423 Boss section (third boss section); 424 Boss section (fourth boss section); 425 Flange section (first flange section); 426 Flange section (second flange section); 427 Gap; 5 Jig; 51 First arm; 51a Claw section; 52 Second arm; 53 Contact section; 681 Circumferential wall section; 682 Bottom wall section (partition wall); 9 Third cover (cover part); CV Control valve; EOP Electric oil pump (electric pump); HS Housing (case); S1 First chamber; S2 Second chamber; M Motor; and X, Z1 Axis of rotation.

The invention claimed is:
1. A power transmission device, comprising:
   a case that accommodates a power transmission mechanism;
   a control valve configured to control an oil pressure supplied to the power transmission mechanism; and
   an electric pump configured to supply oil to the control valve, wherein
   the case has
      a first chamber that accommodates the power transmission mechanism, and
      a second chamber arranged adjacent to the first chamber in a horizontal direction,
   the control valve is arranged upright in the second chamber, oriented so that a plurality of pressure regulating valves are aligned in a vertical direction, the electric pump is provided in the second chamber so that an axis of rotation of a motor is aligned in the vertical direction, the control valve and the electric pump are arranged in a direction of an axis of rotation of the power transmission mechanism, the electric pump has a first flange section where a first arm of a jig engages, and a supported section supported by a second arm of the jig, the supported section forms a circular basic cross-sectional shape in a plane orthogonal to the axis of rotation of the motor, and the first flange section extends from an outer circumference of the supported section.

2. The power transmission device as claimed in claim 1, wherein the first flange section extends in a direction away from the control valve from a region opposite the control valve in the supported section.

3. The power transmission device as claimed in claim 2, wherein the second chamber is a space surrounded by a circumferential wall section encircling an outer circumference of the control valve and the electric pump, a cover section joined to the circumferential wall section and sealing an opening in the circumferential wall section, and a partition wall which divides the first chamber and the second chamber, and in a cross-section along an opening direction of the circumferential wall section, the first flange section is positioned on a cover section side relative to the circumferential wall section.

4. The power transmission device as claimed in claim 2, wherein in the electric pump, a first boss section and a second boss section are provided spaced apart in a direction of the axis of rotation of the motor, and the first flange section is positioned between the first boss section and the second boss section.

5. The power transmission device as claimed in claim 4, wherein the first flange section is connected to the second boss section.

6. The power transmission device as claimed in claim 4, wherein the first flange section is provided spanning across the first boss section and the second boss section.

7. The power transmission device as claimed in claim 4, wherein in the electric pump, a third boss section and a fourth boss section are provided spaced apart in the direction of the axis of rotation of the motor, the third boss section and the fourth boss section are positioned opposite the first boss section and the second boss section across the axis of rotation of the motor, a second flange section is provided between the third boss section and the fourth boss section, the second flange section extends from the fourth boss section positioned on a second boss section side in the direction of the axis of rotation of the motor toward the third boss section positioned on a first boss section side, and a gap is provided between the second flange section and the third boss section.

8. The power transmission device as claimed in claim 1, wherein the electric pump has a contacted part contacted by a contact section of the jig, and the contacted part is a flat surface parallel to a straight line passing through the axis of rotation of the motor when viewed from the direction of the axis of rotation of the motor.

* * * * *